United States Patent [19]
Lee

[11] Patent Number: 5,848,951
[45] Date of Patent: Dec. 15, 1998

[54] CONTROL SYSTEM OF A DOWNSHIFT BY AN AUTOMATIC TRANSMISSION GEAR AND METHOD FOR THE SAME

[75] Inventor: Hee-Yong Lee, Seoul, Rep. of Korea

[73] Assignee: Hyundai Motor Company, Seoul, Rep. of Korea

[21] Appl. No.: 777,441

[22] Filed: Dec. 30, 1996

[30]     Foreign Application Priority Data

Dec. 30, 1995 [KR]   Rep. of Korea ...................... 95-68379

[51] Int. Cl.⁶ ........................... F16H 59/20; F16H 59/40; F16H 59/42; F16H 61/08
[52] U.S. Cl. ......................... 477/133; 477/139; 477/149; 477/161
[58] Field of Search ................................. 477/133, 136, 477/139, 141, 149, 161, 164

[56]            References Cited

U.S. PATENT DOCUMENTS

| | | | |
|---|---|---|---|
| 4,563,917 | 1/1986 | Higashi et al. | 477/133 |
| 4,688,452 | 8/1987 | Aoyama et al. | 477/136 |
| 5,085,105 | 2/1992 | Wakahara et al. | 477/149 |
| 5,188,006 | 2/1993 | Goto et al. | 477/133 |
| 5,431,604 | 7/1995 | Marusue et al. | 477/149 |

*Primary Examiner*—Charles A. Marmor
*Assistant Examiner*—Sherry Lynn Estremsky
*Attorney, Agent, or Firm*—Christie, Parker & Hale, LLP

[57]            ABSTRACT

A control system for downshifting an automatic transmission provides reduced shift shock by controlling pressure fed to a kickdown servo brake. A throttle valve sensor, an input shaft rpm sensor, an output shaft rpm sensor, and a transmission control unit are used. The transmission control unit outputs a control signal for a second-to-first speed shift after reducing hydraulic pressure fed in accordance with a duty pattern when the vehicle is in the state of a second-to-first downshift. Alternatively, the transmission control units outputs a control signal for a second-to-first speed shift after the third-to-second speed shift is completed when the vehicle is in the state of a third-to-first speed shift. In any case, the transmission control units controls first and second transmission control solenoid valves, and a hydraulic pressure control solenoid valve for changing the state of hydraulic pressure fed to every friction member.

8 Claims, 4 Drawing Sheets

CONTROL SYSTEM OF A DOWNSHIFT BY AN AUTOMATIC TRANSMISSION GEAR AND METHOD FOR THE SAME

BACKGROUND OF THE INVENTION

1. Field of the Invention

The present invention relates to a control system for downshifting an automatic transmission gear and method for the same, more particularly, to a control system for downshifting an automatic transmission and method for the same by controlling the hydraulic pressure fed to a kickdown servo brake so as to have an improved response to the downshift.

2. Description of the Prior Art

Generally, when an automatic transmission gear is used in a vehicle, hydraulic pressure is controlled according to the transmission stage as a function of the running speed of a vehicle, and thereby, a corresponding transmission gear to a target transmission stage is automatically achieved. Namely, a torque converter operates from the output power of the engine, thereby controlling the fluid pressure. Signals applied from a transmission control system control the hydraulic pressure fed to corresponding valves. As a result, the corresponding transmission gear to the running state of the vehicle is achieved.

Therefore, the automatic transmission for a vehicle requires a minimum amount of effort on the part of the driver by removing the necessity for a driver to operate a clutch pedal. Also, the automatic transmission makes driving easy since there may be little possibility of an engine being stalled due to clutch engagement at an insufficient speed.

The conventional method for controlling the automatic transmission is as follows. A transmission lever operated by a driver changes a plurality of ports feeding hydraulic pressure from an oil pump to the automatic transmission. The hydraulic pressure fed to the automatic transmission changes the operational state of a pressure valve controlling the operational state of friction members comprising clutches and a brake. In a transmission gear mechanism, one transmission stage can be selected by the operation of the friction members. Then a planetary gear is operated according to the selective operation of the friction members, and an adequate transmission gear ratio is fed to a drive gear. The power is fed to a drive gear and then to a differential gear of a final reduction device through a transfer driven gear engaged with the drive gear.

As described above, in the conventional method, the plurality of electrical signals are changed by the transmission control system, thereby operating the transmission gear of a target transmission stage according to the running state of the vehicle.

However, in a second-to-first speed downshift or a third-to-first speed downshift there is a need to stop the operation of the kickdown servo brake since the kickdown servo brake operates only when the transmission is in a second speed or a fourth speed. Therefore, the transmission control system changes the operational state of a hydraulic pressure control solenoid valve thereby exhausting hydraulic pressure fed to a kickdown servo brake at the second speed via first and second speed shift solenoid valves.

As a result, in the conventional transmission gear large shift shock is generated when hydraulic pressure fed to the kickdown servo brake is abruptly exhausted by the operation of the hydraulic pressure control solenoid valve.

SUMMARY OF THE INVENTION

The present invention has been made in an effort to solve the above-mentioned problems. It is an object of the present invention to provide a control system for downshifting an automatic transmission gear and method for the same having an improved response to a downshift by controlling hydraulic pressure fed to the kickdown servo brake.

Additional objectives and advantages of the present invention will be set forth in part in the description which follows, and in part will be apparent from the description, or may be learned by practice of the invention. The objectives and advantages of the present invention are particularly pointed out in the appended claims.

To achieve the above object in accordance with the purpose of the invention, as embodied and broadly described herein, the present invention comprises, a throttle valve sensor for sensing an opening of a throttle valve wherein the variable opening of a throttle valve, according to the operation of an accelerator pedal, changes an electrical signal to be outputted;

an input shaft rpm sensor for sensing revolution per minute (rpm) of the input shaft wherein a rotational speed of the input shaft of a hydraulic pressure device of the automatic transmission changes an electrical signal to be outputted;

an output shaft rpm sensor for sensing rpm of the output shaft of the hydraulic pressure device of the automatic transmission wherein a rotational speed of the output shaft changes an electrical signal to be outputted;

a transmission control unit connected to the throttle valve sensor, the input shaft rpm sensor and the output shaft rpm sensor and for determining whether or not the vehicle is in the state of a downshift if the running state of a vehicle meets predetermined conditions, 300 rpm <rpm of an output shaft <900 rpm, an opening of an throttle valve >1.25 V and rpm of an engine >2000 rpm thereby outputting a control signal for a second-to-first speed shift after reducing hydraulic pressure fed to corresponding friction members to a predetermined state using every duty pattern when the vehicle is in the state of a second-to-first downshift, or a control signal for a second-to-first speed shift keeping the state of the vehicle within the above-mentioned condition after the third-to-second speed shift is completed when the vehicle is in the state of a third-to-first speed shift;

first and second transmission control solenoid valves wherein the control signal output from the transmission control unit changes operation of the first and second transmission control solenoid valves, thereby operating a corresponding transmission; and a hydraulic pressure control solenoid valve wherein the control signal output from the transmission control unit changes operation of the hydraulic pressure control solenoid valve thereby changing the operational state of pressure fed to every friction member.

To achieve the above object in accordance with the purpose of the invention, as embodied and broadly described herein, one preferred embodiment of the present invention comprises the following steps:

determining whether or not the running state of the vehicle meets the above-mentioned conditions;

determining whether or not the vehicle is in the state of a downshift if the above-mentioned conditions are met;

detecting variable values according to the opening of a throttle valve determined by the output signal from the throttle valve sensor thereby setting a duty pattern if the vehicle is in state of a second-to-first speed downshift;

outputting a control signal for controlling the operation of the hydraulic pressure control solenoid valve according to the duty pattern; and outputting the corresponding control signal to the first and second transmission control solenoid valves thereby completing a shift to first speed if the predetermined state of the transmission is completed by the operation of the hydraulic pressure control solenoid valve in accordance with the duty pattern.

To achieve the above objective in accordance with the purpose of the invention, as embodied and broadly described herein, another preferred embodiment of the present invention comprises the following steps:

determining whether or not the running state of the vehicle meets the above-mentioned conditions;

determining whether or not the vehicle is in the state of a downshift if the above-mentioned conditions are met;

outputting a corresponding control signal for a third-to-second speed shift to the first and second transmission control solenoid valves if the vehicle is in the state of a third-to-first downshift.

outputting a control signal for controlling the operation of the hydraulic pressure control solenoid valve according to the duty pattern for the third-to-second speed shift;

detecting variable values according to the opening of a throttle valve determined by the signal output from the throttle valve sensor thereby setting a duty pattern for the operation of a second-to-first speed shift if the third-to-second speed shift is completed;

outputting the control signal controlling the operation of the hydraulic pressure control solenoid valve according to the duty pattern; and outputting the corresponding control signal to the first and second transmission control solenoid valves thereby completing a shift to a first speed if the predetermined state of the transmission is completed by the operation of the hydraulic pressure control solenoid valve in accordance with the duty pattern.

BRIEF DESCRIPTION OF THE DRAWINGS

The above objective and feature of the present invention will be apparent from the following description of the embodiment with reference to the accompanying drawings.

DESCRIPTION OF THE PREFERRED EMBODIMENTS

Reference will now be made in detail to present the preferred embodiment of the present invention, an example of which is illustrated in the accompanying drawings.

Figure 1:
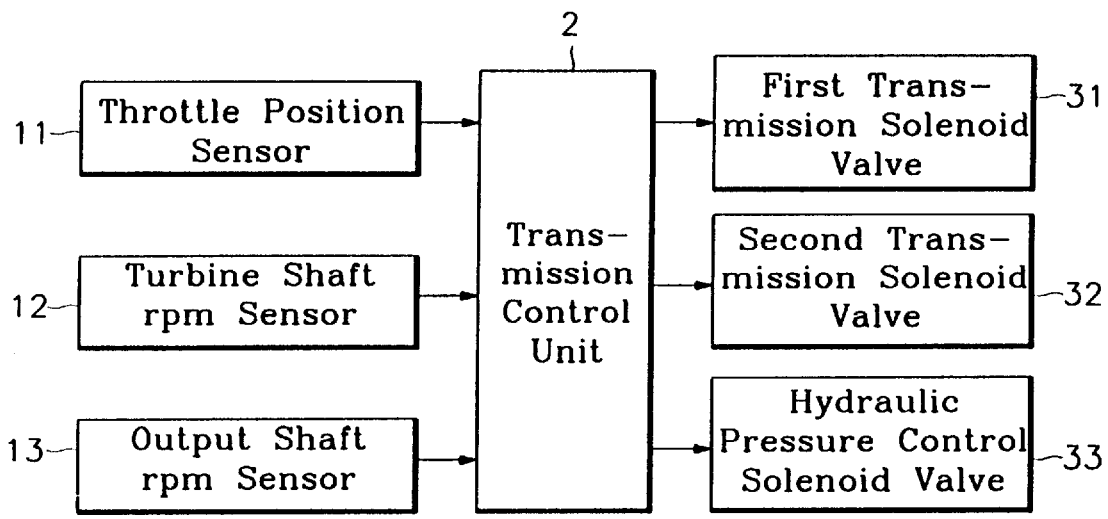
FIG. 1 is a block diagram for a control system of a downshift by an automatic transmission gear according to the embodiment of the present invention.

Referring to FIG. 1, the present invention employs a throttle position sensor 11 for sensing the opening of a throttle valve, and outputting a corresponding electrical signal. The throttle opening is controlled by an accelerator pedal. A turbine shaft rpm sensor 12 is used for sensing the rpm of a turbine shaft and outputting a corresponding electrical signal. The turbine shaft is the input shaft to the automatic transmission. An output shaft rpm sensor 13 is used for sensing the rpm of the output shaft of the hydraulic pressure device of the automatic transmission, and outputting a corresponding electrical signal.

The throttle position sensor 11, the turbine shaft rpm sensor 12 and the output shaft rpm sensor 13 are connected to a transmission control unit 2 which controls a duty ratio of hydraulic pressure fed to the kickdown servo brake, thereby outputting a control signal for a downshift when the vehicle is in the downshifting state.

The transmission control unit 2 outputs control signals to first and second transmission control solenoid valves 31 and 32 to change their operational state, and thereby control the transmission stage. The transmission control unit 2 also outputs a control signal to a hydraulic pressure control solenoid valve 33 to change the operational state of pressure fed to the friction members.

Figure 2A:
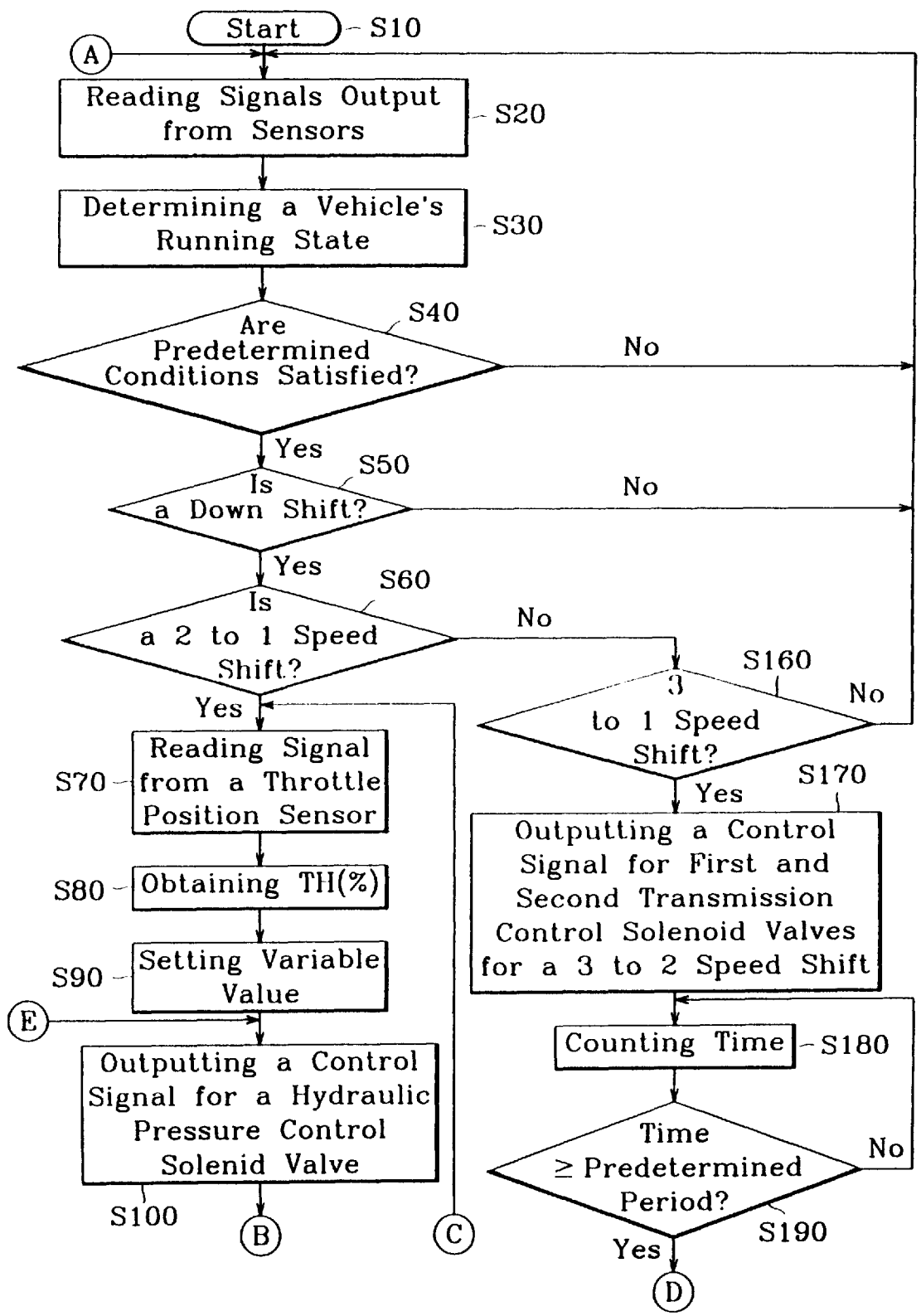
FIG. 2 is a flow chart illustrating the control method of a downshift by an automatic transmission gear according to the embodiment of the present invention.
Figure 2B:
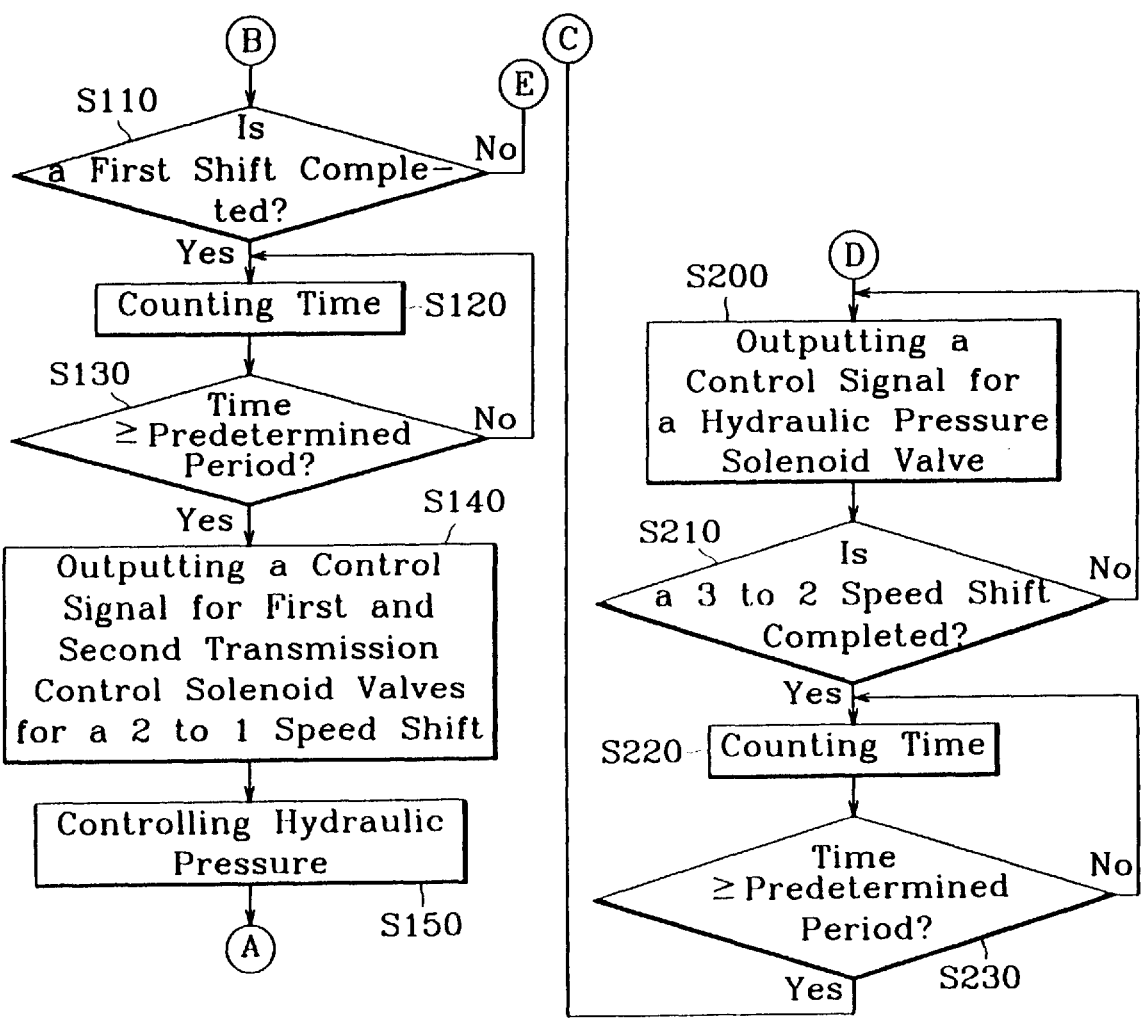

Referring to FIG. 2, the preferred embodiment of the present invention comprises the following steps.

The operation of the transmission control unit 2 and every corresponding device starts if necessary when power is applied S10. The transmission control unit 2 reads the signal output from the above-mentioned sensors 11, 12 and 13 S20. The transmission control unit 2 detects the rpm of the output shaft of the transmission (No) and the opening of the throttle valve (TH) S30. The transmission control unit 2 determines whether or not the detected opening of the throttle valve (TH) and the rpm of the output shaft of the transmission (No) satisfies the following predetermined conditions S40, (1) 300 rpm<No<900 rpm (2) TH>1.25V (3) Ne>2000 rpm; where Ne is the engine rpm.

Figure 3A:
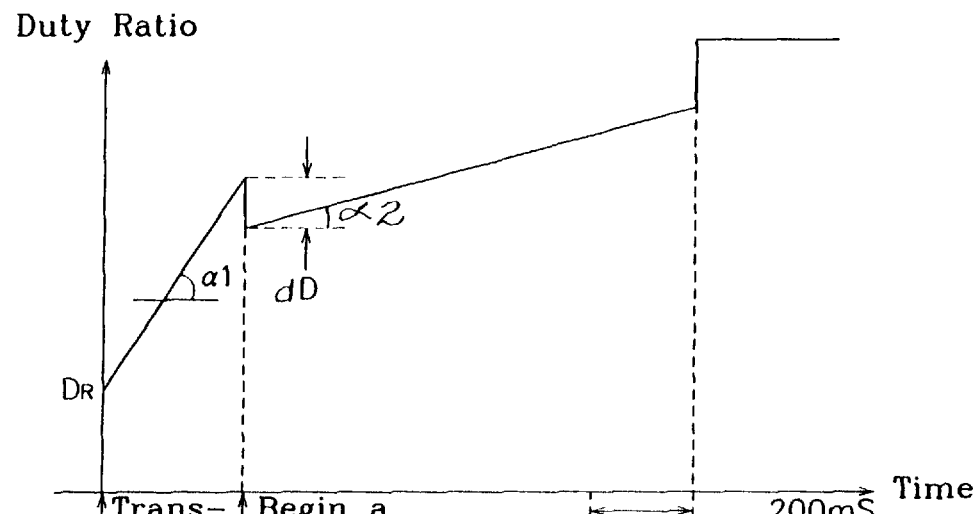
FIG. 3A illustrates the duty pattern as a function of time when a second-to-first speed downshift is operated according to the embodiment of the present invention.

If the above-mentioned conditions are met, the transmission control unit 2 determines whether or not the vehicle is in the downshift state S50. If the vehicle is in the downshift state, the transmission control unit 2 determines whether or not the vehicle is in a second-to-first speed shift state S60. If the vehicle is in the second-to-first speed shift state, the transmission control unit 2 reads the signal input from the throttle position sensor 11. The signal input is a voltage corresponding to the opening of a throttle valve which is controlled by the accelerator pedal S70. The transmission control unit 2 detects a voltage corresponding to the opening of the throttle valve S80. The transmission control unit 2 computes every variable value of the duty pattern to be set according to the voltage value S90. Referring to FIG. 3A, the corresponding variable values to the voltage, determined by the opening of the throttle valve (TH), are as follows:

TABLE 1

| TH | Dr | α1 | α2 | dD |
|---|---|---|---|---|
| 1.25 V < TH < 3.5 V | 60% | 30%/s Upgrade | 10%/s Upgrade | 50% |
| 3.5 V < TH < 5 V | 53% | 40% Upgrade | 15% Upgrade | 7% |

The transmission control unit 2 controls the operation of the hydraulic pressure solenoid valve 33 according to the predetermined duty ratio S100.

Figure 3B:
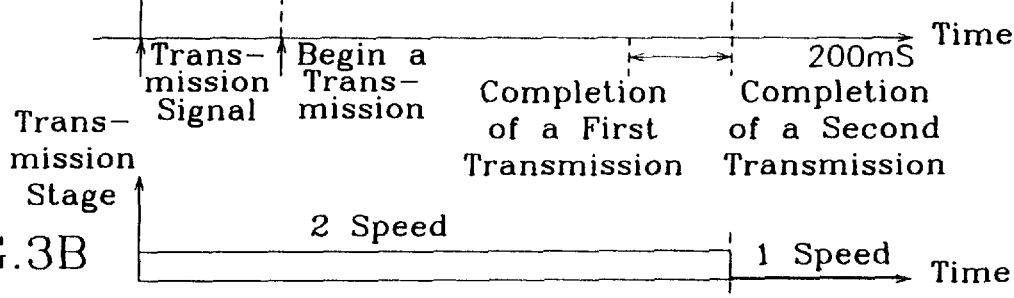
FIG. 3B illustrates a graph showing the state of transmission stage as a function of when a second-to-first speed downshift according to the embodiment of the present invention is operated.

The transmission control unit 2 determines whether or not the vehicle mechanically completes the transmission S110. The transmission control unit 2 reads the signals from the above-mentioned sensors at regular intervals. If the value obtained by multiplying the rpm of the output shaft detected by the signal from the output shaft rpm sensor 13 by the transmission ratio of the first speed is the same as the rpm of the input shaft detected by the signal from the turbine shaft rpm sensor 12, it is determined that a first shift to a first speed is completed. If the vehicle completes the first shift to the first speed, the transmission control unit 2 measures time S120 and after a predetermined time period has elapsed S130 changes the operational state of the first and second transmission control solenoid valves 31 and 32 to enable the second-to-first speed downshift S140. Then, the transmission control unit 2 maintains the operation of the hydraulic pressure solenoid valve in the first speed according to the duty ratio set at the first speed S150 (as shown in FIG. 3B). The transmission control unit 2 controls the duty ratio of the hydraulic pressure solenoid valve before performing step S150.

Figure 3C:
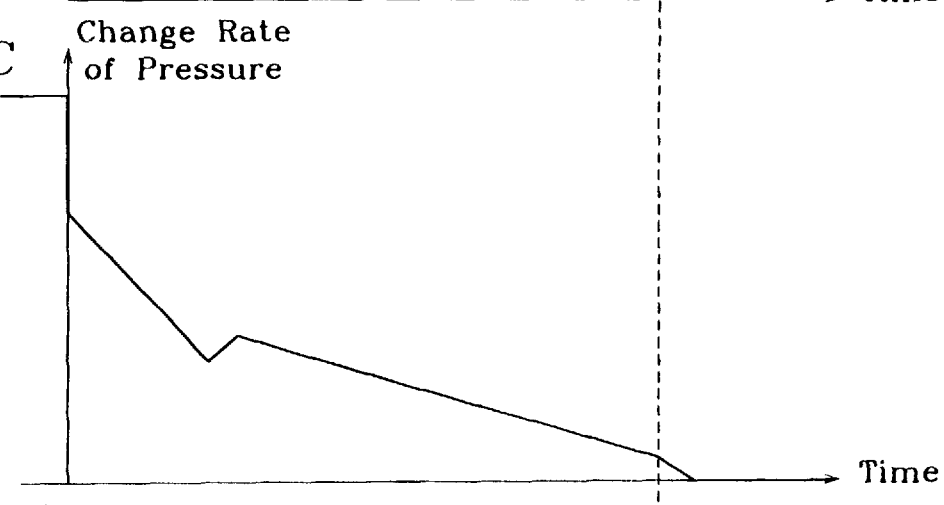
FIG. 3C illustrates a graph showing the variable input as a function of time when a second-to-first speed downshift according to the embodiment of the present invention is operated.
Figure 3D:
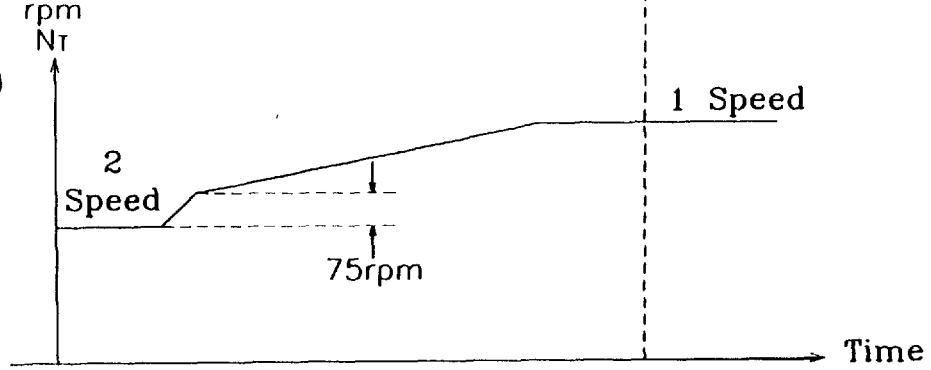
FIG. 3D illustrates a graph showing the variable rpm of a turbine shaft as a function of time when a second-to-first speed downshift according to the embodiment of the present invention is operated.

FIG. 3C illustrates a change rate of line pressure when the operation of the hydraulic pressure solenoid valve is controlled by the predetermined duty pattern. FIG. 3D illustrates variable rpm of the engine. Since the pressure value fed to every variable friction member is reduced as illustrated in FIG. 3C as time passes, the shift shock generated when the operational states of the friction members are changed is reduced.

Referring to step S60, if the vehicle is not in the second-to-first speed downshift state, the transmission control unit 2 determines whether or not the vehicle is in a third-to-first speed shift state S160.

If the transmission is not in the third-to-first speed shift state, the transmission control unit 2 returns to step S20 and reads the signals from the sensors to determine the running condition of the vehicle.

If the vehicle is in the third-to-first speed shift state, the transmission control unit 2 operates the third-to-second speed shift. If the vehicle is in third speed, the operational state of the first and second transmission control solenoid valves 31 and 32 is OFF. When the vehicle is shifted to second speed, the operational state of the second transmission control solenoid valve 32 is changed to ON. The control signal for changing the operational state of the second transmission control solenoid valve 32 from OFF to ON is output S170.

Figure 4A:
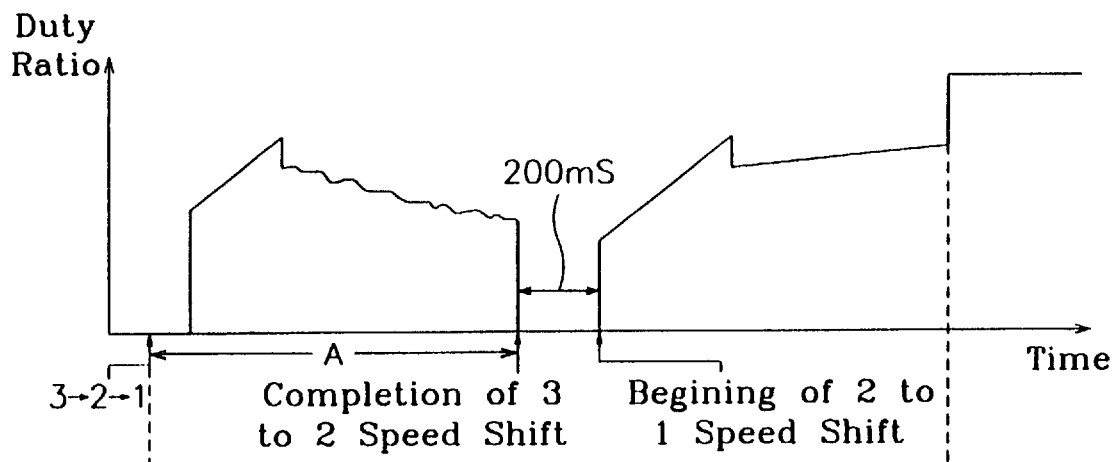
FIG. 4A illustrates the duty pattern as a function of time when a third-to-first speed downshift according to the embodiment of the present invention is operated.
Figure 4B:
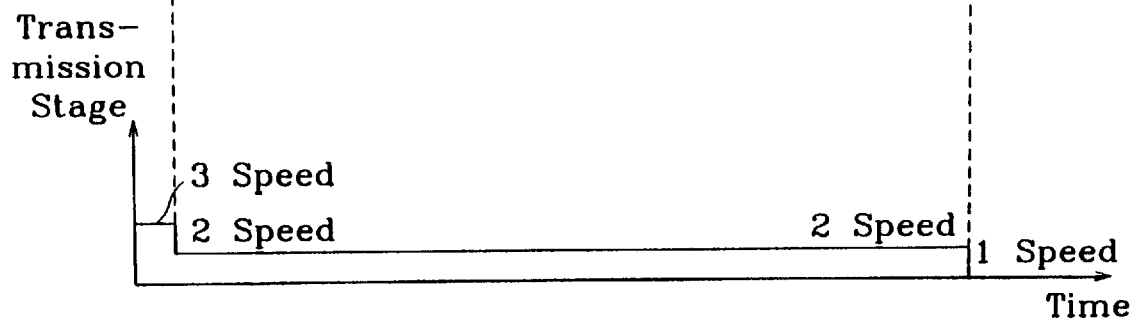
FIG. 4B illustrates a graph showing the state of a transmission stage as a function of time when a third-to-first speed downshift according to the embodiment of the present invention is operated.

Then, the transmission control unit 2 measures time S180 and after a predetermined time period passes 190, the transmission control unit 2 controls the operation of the hydraulic pressure solenoid valve according to the duty pattern illustrated in FIG. 4A so that a downshift to a second speed can be achieved S200. The control duty pattern of the hydraulic pressure solenoid valve 33 for downshifting to second speed is the same as that for the third-to-second downshift. The transmission control unit 2 determines whether or not the vehicle completes a third-to-second speed shift S210. If a value obtained by multiplying the rpm valve of the output shaft detected by the signal from the output shaft rpm sensor 13 by the transmission ratio set at the second speed is the same as the rpm of the input shaft detected by the signal from the turbine shaft rpm sensor 12, it is determined that the vehicle completes the shift to the second speed.

If it is determined that the vehicle completes the third-to-second speed shift, the transmission control unit 2 measures time S220, and after a predetermined time period passes S230, the transmission control unit 2 returns to step S70 and performs the steps to S150 for the second-to-first speed shift.

Since the second-to-first speed shift is gradually operated after the predetermined period from the completion of the first second-to-first speed shift, the operational state of the hydraulic pressure solenoid valve is stabilized thereby improving the response to a downshift. Namely, the shift shock generated during the third-to-first speed shift can be reduced by operating the third-to-second speed shift, then second-to-first speed shift gradually after the predetermined period.

Accordingly, the control system of a downshift by an automatic transmission according to the preferred embodiment of the present invention can provide reduced shift shock by stopping reaction force members of a second speed so as to complete the first shift to the first speed, then changing the solenoid valve to be in the second-to-first speed shift. Also, the control system for downshifting the automatic transmission gear according to the preferred embodiment of the present invention can provide reduced shift shock by gradually operating the downshift to a first speed after the completion of the downshift to a second speed when the third-to-first speed shift is operated. As a result, the hydraulic pressure device can be protected due to reduced shift shock and the load fed to the corresponding friction members.

What is claimed is:

1. A control system of a downshift by an automatic transmission gear comprising:

a throttle valve sensor for sensing an opening of a throttle valve wherein variations of said opening of the throttle valve, according to an operation of an accelerator pedal, changes an electrical signal to be outputted;

an input rpm sensor for sensing revolutions per minute (rpm) of an input shaft wherein variations in the rotational speed of said input shaft changes an electrical signal to be outputted;

an output shaft rpm sensor for sensing rpm of an output shaft wherein variations in the rotational speed of the output shaft changes an electrical signal to be outputted;

a transmission control unit connected to said throttle valve sensor, said input shaft rpm sensor and said output shaft rpm sensor and for determining that a vehicle is in a state of a downshift if the running state of the vehicle satisfies predetermined conditions, thereby outputting a control signal for a shift to a first speed after reducing hydraulic pressure fed to friction members to a predetermined state using a duty pattern when the vehicle is in a state of a second-to-first speed downshift, or a control signal for a second-to-first speed shift after a third-to-second speed shift is completed when the vehicle is in a state of a third-to-first speed shift;

a first and a second transmission control solenoid valve wherein said control signal output from said transmission control unit changes their operation so that a a transmission ratio corresponding to the downshift state of the vehicle can be obtained; and a hydraulic pressure control solenoid valve wherein said control signal outputted from the transmission control unit changes its operation so that the operational state of pressure fed to every friction member may be changed;

wherein said transmission control unit detects variable values according to said opening of the throttle valve determined by said output signal from said throttle valve sensor to set the duty pattern, outputs said control signal for controlling the operational state of said hydraulic pressure control solenoid valve according to the duty pattern and outputs a control signal for changing the operation of said first and second transmission control solenoid valves to be in the first speed after a predetermined period passes from the completion of a predetermined state of the transmission if the vehicle is in the second-to-first speed downshift state.

2. The control system of a downshift by an automatic transmission gear according to claim 1 wherein said rpm of an output shaft detected by said signal from said output shaft rpm sensor and said opening of a throttle valve obtained by said signal from said throttle valve sensor satisfies said predetermined conditions, 300 rpm<rpm of an output shaft<900 rpm and an opening of an throttle valve>1.25 volts.

3. The control system of a downshift by an automatic transmission gear according to claim 1 wherein said transmission control unit outputs a control signal for controlling the operational state of said hydraulic pressure control solenoid valve according to a duty pattern for a third-to-second speed shift, detects variable values according to said opening of the throttle valve determined by said output signal from said throttle valve sensor to set the duty pattern, outputs said control signal for controlling the operational state of said hydraulic pressure control solenoid valve according to said duty pattern and outputs a control signal for changing an operation of said first and second transmission control solenoid valves to be in the first speed after said predetermined period passes from said predetermined state of the transmission is completed if the vehicle is in the third-to-first speed downshift state.

4. The control system of a downshift by an automatic transmission gear according to claim 1 wherein said predetermined state of the transmission is completed if a value obtained by multiplying the rpm value of the output shaft detected by said output shaft rpm sensor by a transmission ratio of the first speed is the same as the rpm value of the input shaft detected by said input shaft rpm sensor.

5. A control system for downshifting an automatic transmission, said automatic transmission having an input shaft, a plurality of friction members, and an output shaft, the input shaft being driven by an engine, said engine having a throttle valve, the control system, comprising:

a throttle valve sensor for sensing an opening of the throttle valve;

an input shaft rpm sensor for sensing a rotational speed of the input shaft;

an output shaft rpm sensor for sensing a rotational speed of the output shaft;

a transmission control unit for generating a downshift control signal, and reducing hydraulic pressure fed to the friction members, said transmission control generating the downshift control signal after the hydraulic pressure is reduced, said downshift control signal being a function of outputs of said throttle valve sensor, input shaft sensor and output shaft sensor; and a hydraulic pressure solenoid valve for feeding hydraulic pressure to the friction members, said hydraulic pressure solenoid valve being controlled by a duty pattern computed by the transmission control unit as a function of the throttle valve sensor, said downshift control signal being generated after a predetermined time after the automatic transmission reaches a predetermined state.

6. The control system of claim 5 wherein said downshift control signal is generated when the rotational speed of the output shaft is between 300 rpm and 900 rpm, and the throttle valve sensor has an output exceeding 1.25 volts.

7. The control system of claim 5 wherein the predetermined state of the automatic transmission occurs when the rotational speed of the output shaft multiplied by a first speed ratio of the automatic transmission is equal to the rotational speed of the input shaft.

8. The control system of claim 5 further comprising a hydraulic pressure solenoid valve for feeding hydraulic pressure to the friction members, said hydraulic pressure solenoid control valve being controlled by a third-to-second duty pattern, and after a predetermined time controlled by a second-to-first duty pattern, said duty patterns being generated by the transmission control unit, and said second-to-first duty pattern being a function of the throttle valve sensor, said downshift control signal being generated after a predetermined time after the automatic transmission reaches a predetermined state.

* * * * *